United States Patent [19]

Atwood et al.

[11] 3,872,212

[45] Mar. 18, 1975

[54] SEPARATION OF POTASSIUM IONS FROM SODIUM IONS USING ALKANOLAMINES

[75] Inventors: Gilbert R. Atwood, Briarcliff Manor; Robert J. Blake, Yorktown Heights; Kenneth F. Butwell, Newburgh; David A. Dunnery, New York, all of N.Y.

[73] Assignee: Union Carbide Corporation, New York, N.Y.

[22] Filed: May 31, 1973

[21] Appl. No.: 365,684

[52] U.S. Cl................. 423/184, 23/230 R, 23/300, 23/302, 423/551
[51] Int. Cl. ...... C01d 5/02, B01j 17/04, C01d 1/34
[58] Field of Search .......... 423/551, 552, 181, 184, 423/193, 202, 482, 194; 23/230 R, 300, 302, 296

[56] References Cited

UNITED STATES PATENTS

| | | | |
|---|---|---|---|
| 3,231,340 | 1/1966 | Gaska .................................. | 23/302 |
| 3,279,897 | 10/1966 | Goodenough et al. ............. | 423/194 |
| 3,437,451 | 4/1969 | Every et al............................ | 23/300 |
| 3,767,763 | 10/1973 | Bunting et al. ..................... | 423/194 |

*Primary Examiner*—O. R. Vertiz
*Assistant Examiner*—Gary P. Straub
*Attorney, Agent, or Firm*—Saul R. Bresch

[57] ABSTRACT

Potassium ions can be separated from sodium ions in aqueous solution by contact with alkanolamine solutions containing stoichiometric amounts of sulfate ions.

8 Claims, No Drawings

3,872,212

SEPARATION OF POTASSIUM IONS FROM SODIUM IONS USING ALKANOLAMINES

BACKGROUND OF THE INVENTION

This invention pertains to the separation of potassium from sodium ions and more particularly to the precipitation of potassium ions with alkanolamine solutions containing stoichiometric amounts of sulfate ions.

The analytical determination of potassium ions in the presence of sodium ions is a difficult task because of the similarity of their properties, both belonging to the class known as alkali metals. Although spectral methods have been devised, there has been no known method for their gravimetric quantitative analysis. It is therefore an object of this invention to provide such a method.

Another object of this invention is to provide a method for separating and recovering potassium from sodium ions. This end is particularly useful in the preparation of fertilizer compositions having enhanced potassium content although in this variation of the invention the separation is not a quantitative procedure with respect to recovery of potassium ions.

Prior art methods used in the past employing selective and partial crystallization of mixtures of sodium chloride and potassium chloride are tedious and uneconomical.

SUMMARY OF THE INVENTION

A method has now been found for the separation of potassium cations from sodium cations which comprises:

A. converting at least part of an aqueous solution of a mixture of potassium and sodium salts to an aqueous solution of potassium sulfate and sodium sulfate, ranging from about 2 to 25% salts by weight;
B. mixing the aqueous solution of potassium and sodium sulfates with from 0.05 to 10 parts by weight per part of solution (A) of an alkanolamine having about 2 to 6 carbon atoms in the alkanol moiety, whereby more than 75% by weight of the potassium salt precipitates out of solution as crystalline potassium sulfate;
C. isolating the precipitated potassium sulfate from the mixture of (B);
D. removing water from the mixture remaining in (C) after isolation of precipitated potassium sulfate until the remaining salts precipitate out solution; and
E. isolating the precipitated salts.

A variation of this method for the assay of potassium in a mixture of water soluble sodium and potassium salts has also been found which comprises:

A. dissolving the mixture of sodium and potassium salts in water to a concentration of about 2 to about 25% salts by weight;
B. adding about 1 to 100 parts, per part of sodium and potassium salts (A) of an aqueous solution containing at least 60% by weight of an alkanolamine having about 2 to 6 carbon atoms in the alkanol moiety;
(C) adding an aqueous solution of sodium sulfate or sulfuric acid, free of potassium impurities, to the mixture of (A) and (B) until no further precipitation of potassium sulfate occurs; and
(D) isolating and weighing the precipitated potassium sulfate.

DESCRIPTION OF THE INVENTION

The alkanolamines useful in this invention may be monoalkanolamines, dialkanolamines, trialkanolamines or tetraalkanol alkylenediamines having about 2 to about 6 carbon atoms in the alkanolamine or alkylene moieties.

The preferred alkanolamines however are trialkanolamines and tetraalkanol alkylenediamines of which triethanolamine and tetrahydroxyethyl ethylenediamine are particularly preferred respectively. Other useful triethanolamine include tri-n-propanolamine, tri-isopropanolamine, tri-n-butanolamine, tri-isobutanolamine, tri-n-pentanolamine, tri-isopentanolamine, tri-n-hexanolamine, and the like.

Representative dialkanolamines include diethanolamine, di-n-propanolamine, di-isopropanolamine, di-n-butanolamine, di-isobutanolamine, di-n-pentanolamine, di-sec-pentanolamine, di-n-hexanolamine, and the like.

Exemplary monoalkanolamines include monoethanolamine, mono-n-propanolamine, mono-isopropanolamine, mono-n-butanolamine, mono-isobutanolamine, mono-n-pentanolamine, mono-isopentanolamine, mono-n-hexanolamine, and the like.

Other tetraalkanol alkylenediamines include tetrahydroxyethyl propylenediamine, tetrahydroxypropyl ethylenediamine, tetrahydroxybutyl ethylenediamine, and the like.

As an analytical technique for the assay of potassium in the presence of sodium, the method is preferably carried out with a dilute aqueous salt solution (that is, less than about 1% by weight of salt) in a concentrated aqueous alkanolamine solution (that is, greater than about 60% by weight of alkanolamine). Under these circumstances the potassium sulfate can be quantitatively precipitated out without the solubility of sodium sulfate being exceeded. As a commercial separation process, however, such a high ratio (about 100:1) of alkanolamine to salt may be undesirable. Accordingly, in the latter case, it may be preferable to use a lower alkanolamine to salt ratio, that is, about 10:1 or less. In this event although most of the potassium sulfate can be precipitated out, sodium-free, before the sodium sulfate solubility limit is reached, some potassium sulfate has to be left in the remaining sodium sulfate solution, to be later precipitated out with it.

The original source of the potassium and sodium ions is not critical and so the compounds which supply these ions as cations can be inorganic or organic. Representative inorganic anions associated with the potassium and sodium cations include chlorides, nitrates, sulfates, and the like. Representative organic anions associated with the potassium and sodium cations include acetates, propionates, citrates, benzoates, and the like.

The form in which sulfate ion is introduced into the system is not critical. Thus, for example, in the simplest method sulfuric acid may be added directly to the aqueous solution of potassium ions. The aqueous solution may also be sparged with sulfur trioxide which in the presence of water provides sulfate anions or sulfate anions may be introduced as a salt, such as, sodium sulfate or ammonium sulfate.

It is not necessary that the order of the steps in the method of this invention be followed rigidly. Thus for example the sulfate or sulfuric acid can be added before or after the addition of the alkanolamine.

The temperature at which this separation of potassium ions from sodium ions is effected is not narrowly critical but for convenience ambient or room temperature is preferred. Higher temperatures may be used in certain cases to obtain lower viscosity and improved crystal size and habit.

Pressure is also not critical but again it is more convenient to employ atmospheric pressure although superatmospheric as well as subatmospheric pressures can be used if desired.

The time of contact between the aqueous solution of potassium and sodium ions and the alkanolamine and sulfate ions is not critical inasmuch as the precipitation reaction is extremely rapid being an ionic reaction and is to all extents and purposes irreversible. However, slowly grown crystals will be larger and can be more easily filtered.

The invention is further described in the examples which follow. All parts and percentages are by weight, unless otherwise specified.

EXAMPLE 1

15 Lbs. of a salt cake of 50% NaCl and 50% KCl by weight are treated with a stoichiometric amount of $H_2SO_4$ in 40 lbs. of water. The resulting mixture is boiled to remove (and recover) all of the HCl as its water azeotrope, leaving an aqueous solution of sodium and potassium sulfates. 60 Pounds of 67% aqueous triethanolamine is added to this solution over a period of 2 hours, during which time 8.2 lbs. of the $K_2SO_4$ crystallizes out. The $K_2SO_4$ is separated by centrifugation, and the liquor is subsequently boiled to evaporate excess water. During the boiling and subsequent cooling, 9.7 lbs. of salt (assaying 9.1 lbs. $Na_2SO_4$ and 0.6 lbs. $K_2SO_4$) crystallizes out of solution and is removed by centrifugation.

EXAMPLE 2

3.3 Pounds of a salt cake of 50/50 by weight KCl and NaCl is dissolved in 40 lbs. water and mixed with 60 lbs. of a 50/50 by weight monoethanolamine/water mixture. To the solution is gradually added with stirring 1.32 lbs. of $Na_2SO_4$ which results in the precipitation of 1.62 lbs. of $K_2SO_4$ for an 84% yield of the available potassium ion. The $K_2SO_4$ is filtered out and the filtrate is boiled to release first the excess water and finally the monoethanolamine which can be recycled. The remaining salt cake consists principally of NaCl and $Na_2SO_4$ with some remaining potassium salts. The addition of aqueous $H_2SO_4$ converts the remainder of the chlorides to HCl and $Na_2SO_4$ if desired.

EXAMPLE 3

0.05 Grams of a salt sample having a potassium content of 0.01717 g. are added to 100 ml. of a 90/10 diisopropanolamine/water mixture. To this is gradually added with stirring 1.5 ml. of aqueous 5% $Na_2SO_4$ solution (potassium free). The resulting precipitate is filtered through a weighed Gooch crucible, washed with 2 batches of a 90/10 diisopropanolamine/water mixture and ignited to red heat. The cooled precipitate weighs 0.0383 g., corresponding to 0.01717 g. potassium. The precipitate is sodium free and the filtrate is similarly free of potassium.

EXAMPLE 4

0.1 Grams of a salt sample having a potassium content of 0.01705 g. are added to 100 ml. of a 90/10 triethanolamine/water mixture. To this is gradually added with stirring 1.5 ml. of an aqueous 10% $Na_2SO_4$ solution (potassium free). The resulting precipitate is filtered through a weighed Gooch crucible, washed with 2 batches of a 90/10 triethanolamine/water mixture and ignited to read heat. The cooled and weighed precipitate is 0.076 g., corresponding to 0.01705 g. potassium. The precipitate is sodium free and the filtrate free of potassium.

Although the invention has been described in its preferred forms with a certain amount of particularity, it is understood that the present disclosure has been made only by way of Example and that numerous changes can be made without departing from the spirit and scope of the invention.

What is claimed is:

1. A method for the separation of potassium cations from sodium cations in an aqueous solution of potassium sulfate and sodium sulfate ranging from about 2 to about 25% salts by weight which comprises:
    A. mixing the aqueous solution of potassium and sodium sulfates with from 0.05 to 100 parts by weight per part of said solution of an alkanolamine having 1 to 4 alkanol moieties and 2 to 6 carbon atoms in each moiety whereby more than 75% by weight of the potassium salt precipitates out of solution as crystalline potassium sulfate;
    B. isolating the precipitated potassium sulfate from the mixture of (A);
    C. removing water from the mixture remaining in (B) after isolation of precipitated potassium sulfate until the remaining salts precipitate out of solution; and
    D. isolating the precipitated salts of (C).

2. Method claimed in claim 1 wherein the upper limit of alkanolamine is 10 parts.

3. Method claimed in claim 2 wherein the alkanolamine is a trialkanolamine.

4. Method claimed in claim 3 wherein the trialkanolamine is triethanolamine.

5. Method claimed in claim 2 wherein the alkanolamine is a tetraalkanol alkylenediamine.

6. Method claimed in claim 5 wherein the tetraalkanol alkylenediamine is tetrahydroxyethyl ethylenediamine.

7. Method claimed in claim 2 wherein the alkanolamine is a dialkanolamine.

8. Method claimed in claim 2 wherein the alkanolamine is a monoalkanolamine.

* * * * *